United States Patent
Kakizaki et al.

(10) Patent No.: US 8,561,420 B2
(45) Date of Patent: Oct. 22, 2013

(54) EVAPORATOR ASSEMBLY FOR AN HVAC SYSTEM

(75) Inventors: Shinji Kakizaki, Dublin, OH (US); Junichi Kanemaru, Upper Arlington, OH (US)

(73) Assignee: Honda Motor Co., Ltd., Tokyo (JP)

(*) Notice: Subject to any disclaimer, the term of this patent is extended or adjusted under 35 U.S.C. 154(b) by 578 days.

(21) Appl. No.: 12/437,871

(22) Filed: May 8, 2009

(65) Prior Publication Data

US 2010/0281902 A1    Nov. 11, 2010

(51) Int. Cl.
*F25B 47/00* (2006.01)

(52) U.S. Cl.
USPC ................... 62/279; 62/150; 62/277

(58) Field of Classification Search
USPC ............................ 62/150, 277, 279
See application file for complete search history.

(56) References Cited

U.S. PATENT DOCUMENTS

| | | | |
|---|---|---|---|
| 4,005,949 A * | 2/1977 | Grant ............................. | 418/15 |
| 4,171,622 A | 10/1979 | Yamaguchi et al. | |
| 4,918,936 A | 4/1990 | Sakamoto | |
| 4,938,035 A * | 7/1990 | Dinh ............................. | 62/279 |
| 5,109,676 A * | 5/1992 | Waters et al. ................. | 62/117 |
| 5,163,304 A | 11/1992 | Phillippe | |
| 5,622,057 A | 4/1997 | Bussjager et al. | |
| 5,765,631 A | 6/1998 | Gerard | |
| 6,070,423 A * | 6/2000 | Hebert ........................... | 62/277 |
| 6,295,826 B1 * | 10/2001 | Lee ................................ | 62/244 |
| 6,931,881 B1 * | 8/2005 | Movshovitz ................... | 62/279 |
| 7,013,658 B2 * | 3/2006 | Dobmeier et al. ............ | 62/150 |
| 2006/0278365 A1 * | 12/2006 | Sanada et al. .................. | 165/41 |
| 2007/0074536 A1 * | 4/2007 | Bai ................................. | 62/513 |
| 2009/0165495 A1 * | 7/2009 | Popov ............................. | 62/441 |

FOREIGN PATENT DOCUMENTS

| | | |
|---|---|---|
| DE | 19630431 | 1/1998 |
| DE | 102004012871 | 10/2005 |
| EP | 1422085 | 5/2004 |

OTHER PUBLICATIONS

European Search Report of EP 10 16 1591 dated Oct. 15, 2010.

* cited by examiner

*Primary Examiner* — Marc Norman
*Assistant Examiner* — Jonathan Bradford
(74) *Attorney, Agent, or Firm* — Rankin Hill & Clark LLP

(57) ABSTRACT

An air conditioning system for a vehicle includes a compressor, a condenser, a first sub-cooler, a metering device, and an evaporator assembly. The evaporator assembly includes an evaporator and a second sub-cooler. The second sub-cooler is arranged below the evaporator such that water condensation from the evaporator drains onto the second sub-cooler to cool the second sub-cooler such that a temperature of the refrigerant exiting the second sub-cooler is less than a temperature of the refrigerant exiting the first sub-cooler.

12 Claims, 4 Drawing Sheets

EVAPORATOR ASSEMBLY FOR AN HVAC SYSTEM

FIELD OF THE INVENTION

The present invention relates to an air conditioning system for a vehicle HVAC system and more specifically to an air conditioning system with an evaporator assembly that includes a sub-cooler.

BACKGROUND

FIG. 1 shows a schematic of a typical air conditioning system 100 for an HVAC system in a vehicle. The air conditioning system 100 includes a compressor 102, condenser 104, a sub-cooler 106, a thermal expansion valve (hereinafter "TXV") 108, and an evaporator 110. A refrigerant is cycled through the air conditioning system 100 in the direction indicated by the arrows. The refrigerant cycle involves a three-phase process that includes pressurization, condensation and vaporization, which will be subsequently explained.

At stage 112, before the refrigerant enters the compressor 102, the refrigerant is a low pressure, low temperature gas. In the pressurization phase, the compressor 102 compresses the low pressure, low temperature gas into a high pressure, high temperature gas. Pressurizing the refrigerant causes the refrigerant to become much hotter than the outside air, which ensures that the refrigerant will change from a gas to a liquid in the next phase.

At stage 114, before the refrigerant enters the condenser 104, the refrigerant is a high pressure, high temperature gas. In the condensation phase, outside air drawn over the condenser 104 absorbs the heat contained in the refrigerant to thereby cause the refrigerant to condense into a high pressure, high temperature liquid. The outside air carries the heat that was absorbed in the evaporation phase described below away from the condenser 104.

At stage 116, before the refrigerant enters the sub-cooler 106, the refrigerant is a high pressure, high temperature liquid. The sub-cooler 106 at the exit side of the condenser 104 reduces the temperature of the refrigerant for two reasons. The first reason is to make sure that all of the refrigerant has been transformed from a gas to a liquid. The second reason is to allow the refrigerant to vaporize in the evaporator 110 at a lower temperature thereby allowing the evaporator 110 to work more efficiently. It should be noted that the sub-cooler 106 reduces the temperature of the refrigerant by only a small amount, typically in the range of 5-10° C. Thus, at stage 118, after the refrigerant exits the sub-cooler 106, the refrigerant is still considered a high pressure, high temperature liquid.

Prior to entering the evaporator 110, the refrigerant enters the TXV 108. The TXV serves more than one function. The TXV 108 regulates the flow of refrigerant into the evaporator 110 based on cooling demand. The TXV 108 also reduces the pressure of the refrigerant, which further decreases the temperature of the refrigerant. This allows the refrigerant to vaporize at a lower temperature once in the evaporator 110 to ensure that the refrigerant will absorb the maximum amount of heat. Thus, at stage 120, the refrigerant is a low pressure, low temperature liquid.

In the vaporization phase, a blower (not shown) forces warm air drawn from inside the vehicle over the evaporator 110. The refrigerant removes the heat from the warm air, which causes the refrigerant in the evaporator 110 to boil thereby converting the refrigerant from a liquid to a gas. Thus, the warm air blowing across the evaporator 110 is cooled to a temperature less than a temperature inside the vehicle. The cool air exits through air conditioning vents to the inside of the vehicle at a much lower temperature than the air inside the vehicle thereby cooling the interior of the vehicle. Simultaneously, the heated refrigerant exits the evaporator 110 and the cycle is repeated.

During the vaporization phase, condensation forms on the evaporator because the moisture from the warm air condenses on the cold evaporator. The condensation eventually drains to the ground outside the vehicle. Thus, a disadvantage of the current air conditioning system is that the system loses cooling energy due to the drainage of the condensation that forms on the evaporator.

Therefore, what is required is an air conditioning system that utilizes the lost energy to increase the efficiency of the air conditioning system.

SUMMARY

In accordance with one aspect, the present invention overcomes the above mentioned disadvantages by providing an evaporator assembly for a vehicle air conditioning system that includes a housing, an evaporator, and a sub-cooler. The evaporator and sub-cooler are both housed in the housing and the sub-cooler is arranged below the evaporator.

In accordance with another aspect, the present invention overcomes the above mentioned disadvantages by providing an air conditioning system for a vehicle that includes a compressor to pressurize a refrigerant cycling through the air conditioning system, a condenser located downstream of and fluidly connected to the compressor to condense the refrigerant, a first sub-cooler located downstream of and fluidly connected to the condenser to reduce a temperature of the refrigerant to a temperature that is less than a temperature of the refrigerant exiting the condenser, a second sub-cooler located downstream of and fluidly connected to the first sub-cooler, a metering device located downstream of and fluidly connected to the second sub-cooler to reduce a pressure of the refrigerant, and an evaporator located downstream of and fluidly connected to the metering device to convert the refrigerant from a liquid to a gas, the evaporator being located upstream of and fluidly connected to the compressor. The second sub-cooler is arranged below the evaporator such that water condensation formed on the evaporator drains onto the second sub-cooler to cool the second sub-cooler such that a temperature of the refrigerant exiting the second sub-cooler is less than a temperature of the refrigerant exiting the first sub-cooler.

Additional benefits and advantages of the present invention will become apparent to those skilled in the art to which it pertains upon a reading and understanding of the following detailed specification.

BRIEF DESCRIPTION OF THE DRAWINGS

The invention may take physical form in certain parts and arrangement of parts, a preferred embodiment of which will be described in detail in this specification and illustrated in the accompanying drawings that form a part of the specification.

DETAILED DESCRIPTION

Prior to describing the evaporator assembly, an air conditioning system containing the inventive evaporator assembly will be described.

Figure 1:
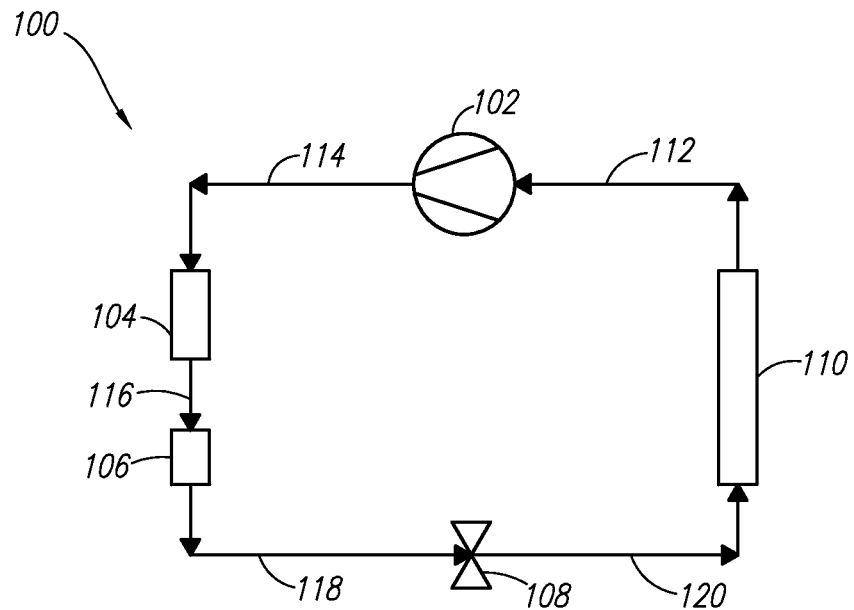
FIG. 1 is a schematic of a prior air conditioning system for a vehicle.
Figure 2:
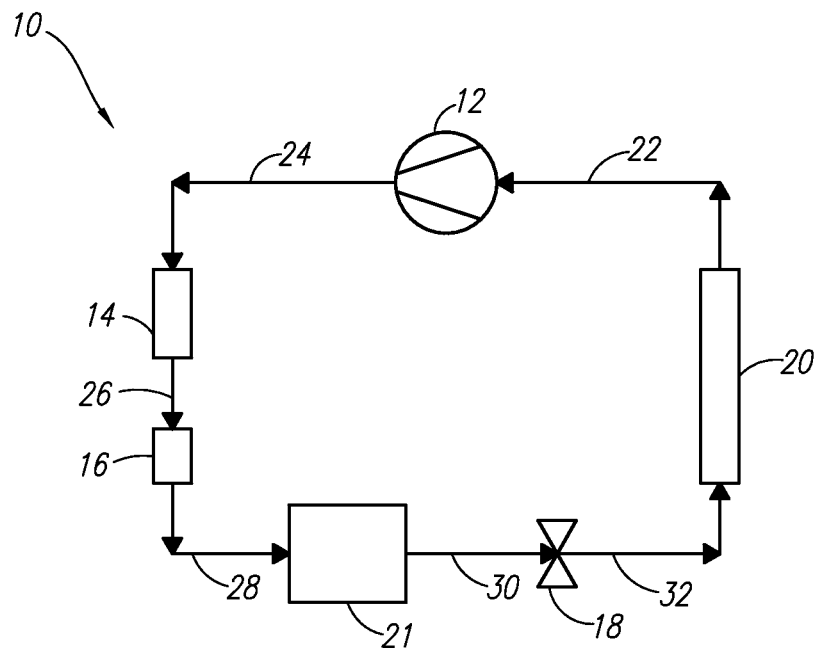
FIG. 2 is a schematic of an air conditioning system for a vehicle according to one exemplary embodiment of the present invention.

FIG. 2 shows a schematic of an air conditioning system 10 for a vehicle HVAC system in accordance with the present invention. The air conditioning system 10 includes a compressor 12, condenser 14, a first sub-cooler 16, a metering device 18, and an evaporator assembly 19, shown in FIG. 3, which includes an evaporator 20 and a second sub-cooler 21. The metering device may be any type of metering device commonly known in the art such as, but not limited to, a thermal expansion valve (hereinafter "TXV") or an orifice tube. For illustration purposes only, a TXV will be used in the embodiment described below and shown in the figures. A refrigerant is cycled through the air conditioning system 10 in the direction indicated by the arrows. The refrigerant cycle involves a three-phase process that includes pressurization, condensation and vaporization, which will be subsequently explained.

At stage 22, before the refrigerant enters the compressor 12, the refrigerant is a low pressure, low temperature gas. In the pressurization phase, the compressor 12 compresses the refrigerant into a high pressure, high temperature gas. Pressurizing the refrigerant causes the refrigerant to become much hotter than the outside air, which ensures that the refrigerant will change from a gas to a liquid in the condensation phase.

At stage 24, before the refrigerant enters the condenser 14, the refrigerant is a high pressure, high temperature gas. In the condensation phase, outside air drawn over the condenser 14 absorbs the heat contained in the refrigerant to thereby cause the refrigerant to condense into a high pressure, high temperature liquid. The outside air carries the heat that was absorbed in the evaporation phase described below away from the condenser 14.

At stage 26, before the refrigerant enters the first sub-cooler 16, the refrigerant is a high pressure, high temperature liquid. The first sub-cooler 16 at the exit side of the condenser 14 reduces the temperature of the refrigerant for at least two reasons. A first reason is to make sure that all of the refrigerant has been transformed from a gas to a liquid. The second reason is to allow the refrigerant to vaporize in the evaporator 20 at a lower temperature thereby allowing the evaporator 20 to work more efficiently. It should be noted that the first sub-cooler 16 reduces the temperature of the refrigerant by only a small amount, typically in the range of 5-10° C. Thus, at stage 28 the refrigerant is still considered a high pressure, high temperature liquid.

The refrigerant then enters the second sub-cooler 21. The second sub-cooler 21 further reduces the temperature of the refrigerant to further increase the efficiency of the evaporator 20 during the vaporization phase explained below. The advantage to the second sub-cooler 21 is that the evaporator 20 and the second sub-cooler are arranged such that the condensation from the evaporator 20 drains onto the second sub-cooler 21 before exiting the vehicle. Thus, the condensation works as an additional means to cool the second sub-cooler 21, explained further below. Therefore, some of the energy lost in the drainage of the condensation in the typical air conditioning system 100 is recaptured and used to cool the second sub-cooler 21.

It should further be noted that the second sub-cooler 21 reduces the temperature of the refrigerant by a small amount. Thus, at stage 30 the refrigerant is still considered a high pressure, high temperature liquid. However, even though the second sub-cooler 21 reduces the temperature of the refrigerant by a small amount, the temperature reduction is enough to allow the evaporator 20 to work less and therefore, more efficiently.

Prior to entering the evaporator 20, the refrigerant enters the TXV 18. The TXV 18 serves more than one function. The TXV 18 regulates the flow of refrigerant into the evaporator 20 based on cooling demand. The TXV 18 also reduces the pressure of the refrigerant, which further decreases the temperature of the refrigerant. This allows the refrigerant to vaporize at a lower temperature once in the evaporator 20 to ensure that the refrigerant will absorb the maximum amount of heat. Thus, at stage 32, the refrigerant is a low pressure, low temperature liquid.

In the vaporization phase, a blower (not shown) forces warm air drawn from inside the vehicle over the evaporator 20. The refrigerant removes the heat from the warm air, which causes the refrigerant in the evaporator 20 to boil thereby converting the refrigerant from a liquid to a gas. Thus, the warm air blowing across the evaporator 20 is cooled to a temperature less than a temperature inside the vehicle. The cool air exits through air conditioning vents to the inside of the vehicle at a much lower temperature than the air inside the vehicle thereby cooling the interior of the vehicle. Simultaneously, the heated refrigerant exits the evaporator 20 and the cycle is repeated.

Further, during the evaporation phase, condensation forms on the evaporator 20 because the moisture from the warm air comes in contact with the cold evaporator thereby condensing on the evaporator 20. Thus, the evaporator 20 also functions as a dehumidifier and the cool air entering the inside of the vehicle is also dehumidified.

Figure 3:
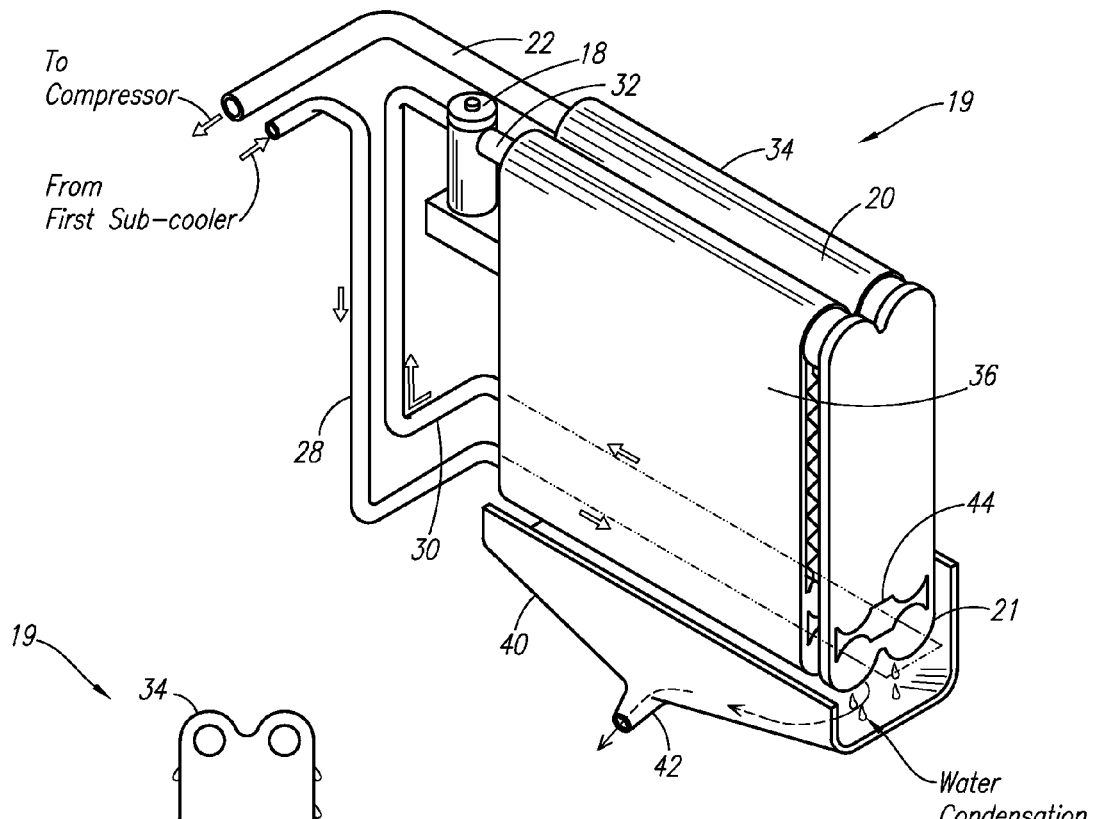
FIG. 3 is a perspective view of an evaporator assembly according to an exemplary embodiment of the present invention.
Figure 4:
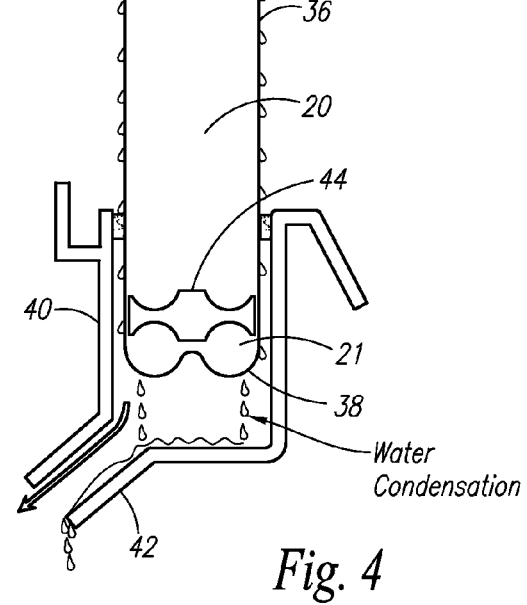
FIG. 4 is a side view of the evaporator assembly of FIG. 3.
Figure 5:
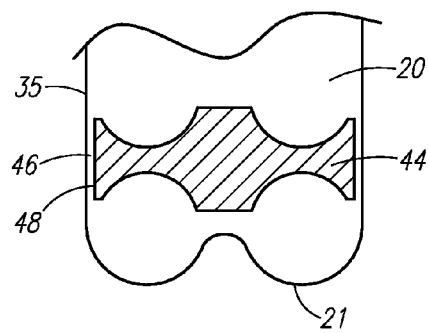
FIG. 5 is an enlarged view of the evaporator assembly of FIG. 4.

Referring to FIGS. 3-5, the inventive evaporator assembly 19 will now be described. FIGS. 3-5 show a first embodiment of the evaporator assembly 19 that includes the evaporator 20 and the sub-cooler 21, which serves as the second sub-cooler 21 mentioned above. Thus, in describing the evaporator assembly 19 the second sub-cooler 21 will simply be referred to as the sub-cooler 21.

In the first embodiment, the evaporator 20 and sub-cooler 21 are arranged in a single evaporator housing 34. The sub-cooler 21 is arranged below the evaporator 20 such that the water condensation forming on an outside surface 36 of the evaporator 20 runs down the outside surface 36 of the evaporator 20 over an outside surface 38 (see FIG. 4) of the sub-cooler 21. The water condensation then drains into a drain pan 40 and out an exit drain 42 where it exits the vehicle. Thus, as explained above, the water condensation serves to reduce the temperature of the sub-cooler 21.

In the first embodiment, the sub-cooler 21 is preferably a plate/fin type heat exchanger. It should be noted, however, that a tube type heat exchanger with an incoming refrigerant line and an outgoing refrigerant may also be used.

The evaporator assembly 19 further includes a heat resistant-insulating material 44 situated between the evaporator 20 and the sub-cooler 21, best shown in FIG. 5. The heat resistant-insulating material 44 minimizes the amount of heat dissipated by the sub-cooler 21 from rising upward to the evaporator 20, which would compromise the efficiency of the evaporator 20. In addition, a gap 46 between each side 48 of the heat resistant-insulating material 44 and each side wall 35 of the housing 34 is minimized to further minimize the amount of heat dissipated by the sub-cooler 21 from rising upward to the evaporator 20.

Figure 6:
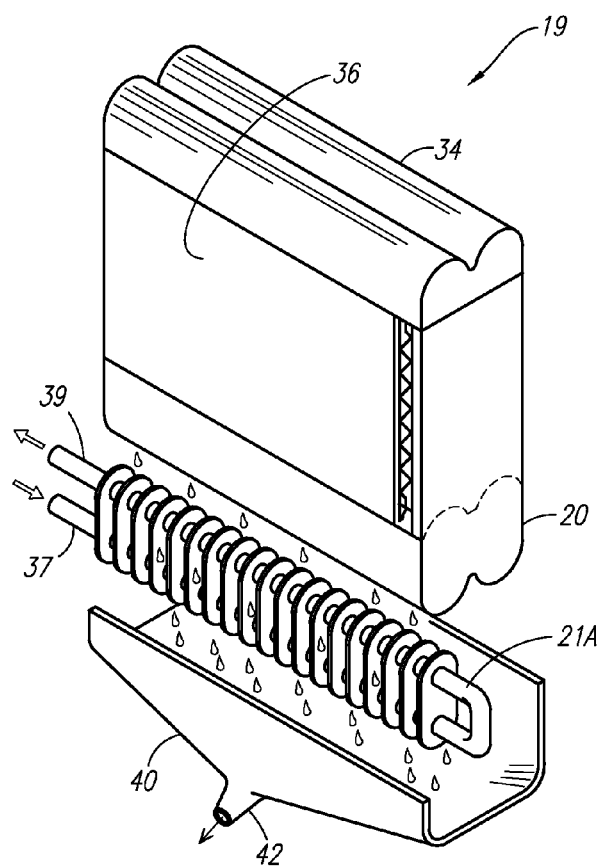
FIG. 6 is an exploded-perspective view of an evaporator assembly according to a second exemplary embodiment of the present invention.
Figure 7A:
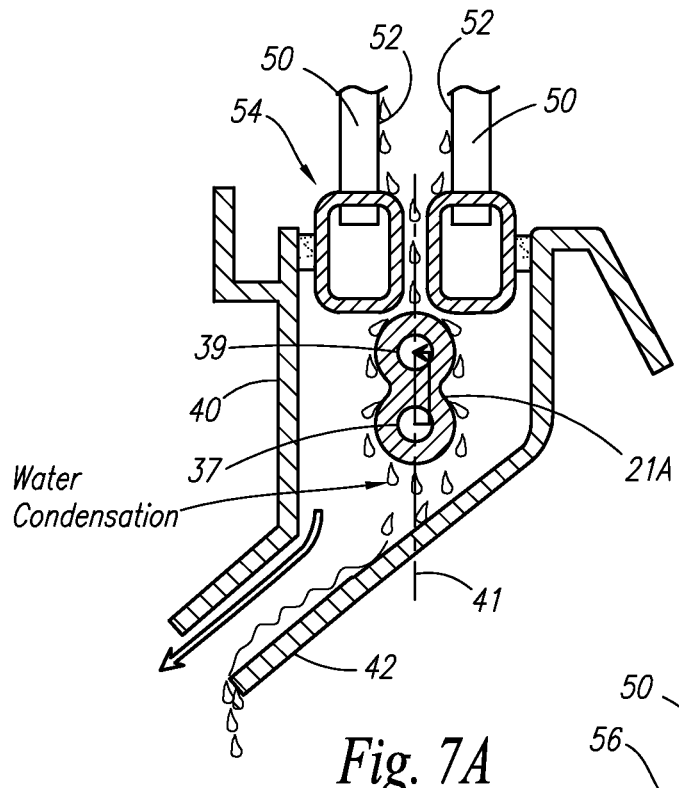
FIG. 7A is an enlarged view of the evaporator assembly of FIG. 6 showing an extruded evaporator tank.
Figure 7B:
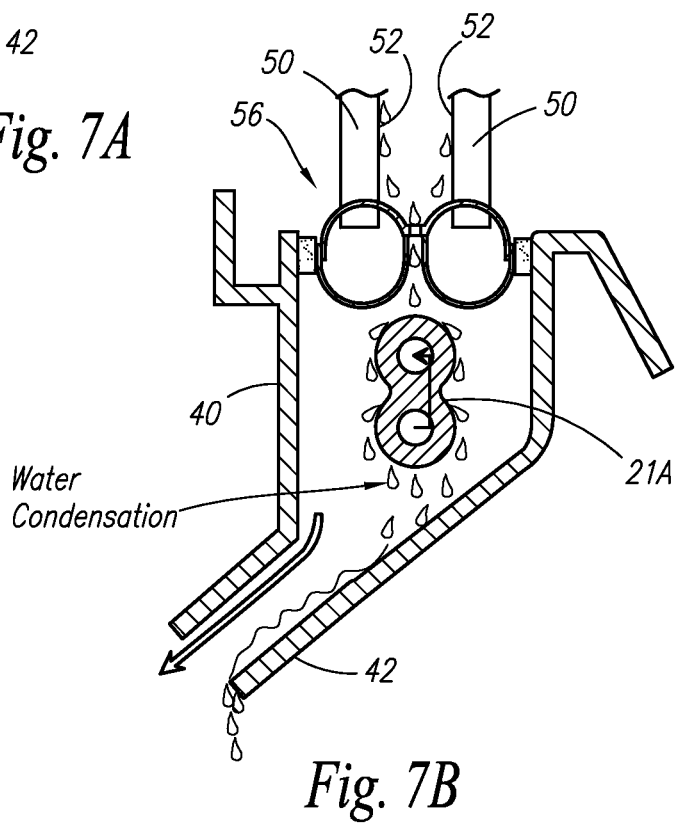
FIG. 7B is an enlarged view of the evaporator assembly FIG. 6 showing a stamped evaporator tank.

FIGS. 6, 7A, and 7B show two variations of a second embodiment of the evaporator assembly 19. Referring to FIG. 6, in the first variation the evaporator assembly 19 includes the evaporator 20, the sub-cooler 21A, and the housing 34. The evaporator 20 and sub-cooler 21A, however, are not housed in the same housing 34. Rather, the sub-cooler 21A is located outside the housing 34 but still positioned beneath the evaporator 20. The water condensation from the evaporator 20 still drains down the outside surface 36 of the housing 34 and onto the sub-cooler 21A to cool the sub-cooler 21A in the same fashion as described above.

Referring to FIGS. 7A and 7B, the second variation is similar to the first variation except that the second variation does not include the housing 34. Thus, the evaporator assembly 19 includes the evaporator 20 and the sub-cooler 21A. In this variation, the warm air from the blower, mentioned above, blows across exposed evaporator tubes 50. Water condensation forms on an inner surface 52 of each evaporator tube 50 and drains between evaporator tanks 54, 56 and onto the sub-cooler 21A to cool the sub-cooler 21A.

In each variation of the second embodiment, the sub-cooler 21A includes an incoming refrigerant tube 37 and an outgoing refrigerant tube 39. Preferably, the incoming refrigerant tube 37 and outgoing refrigerant tube 39 of the sub-cooler 21A are oriented such that a line 41, shown only in FIG. 7A, defined between a center of the both tubes 37, 39 is substantially vertical. It should be noted, however, that the sub-cooler 21A can be oriented such that the line 41 between the center of each tube is substantially horizontal.

FIGS. 7A and 7B also show two types of evaporator tanks, which hold the refrigerant that may be used in the present invention. Specifically, FIG. 7A shows an extruded type tank 54 and FIG. 7B shows a stamped type tank 56. It should be noted, however, that other variations of evaporators commonly known in the art may be used in the present invention.

In summary, the present invention introduces a second sub-cooler 21, 21A into an air conditioning system for a vehicle HVAC system. The addition of the second sub-cooler 21, 21A assists in reducing the temperature of the refrigerant so that the evaporator 20 operates more efficiently.

While specific embodiments of the invention have been described and illustrated, it is to be understood that these embodiments are provided by way of example only and that the invention is not to be construed as being limited but only by proper scope of the following claims.

What is claimed is:

1. An air conditioning system for a vehicle comprising:
a compressor to pressurize a refrigerant cycling through the air conditioning system;
a condenser located downstream of and fluidly connected to the compressor to condense the refrigerant;
a first sub-cooler located downstream of and fluidly connected to the condenser to reduce a temperature of the refrigerant to a temperature that is less than a temperature of the refrigerant exiting the condenser;
a second sub-cooler located downstream of and fluidly connected to the first sub-cooler, the second sub-cooler being fluidly connected in series with the first sub-cooler such that refrigerant passes from the first sub-cooler directly to the second sub-cooler;
a metering device located downstream of and fluidly connected to the second sub-cooler to reduce a pressure of the refrigerant;
an evaporator located downstream of and fluidly connected to the metering device to convert the refrigerant from a liquid to a gas, the evaporator being located upstream of and fluidly connected to the compressor; and
a housing in which the evaporator is housed,
wherein the second sub-cooler is arranged directly below the evaporator and the housing so as to be spaced from the evaporator and disposed outside the housing, such that water condensation formed on the evaporator drains onto the second sub-cooler to cool the second sub-cooler such that a temperature of the refrigerant exiting the second sub-cooler is less than a temperature of the refrigerant exiting the first sub-cooler.

2. The air conditioning system of claim 1, wherein the metering device is a thermal expansion valve, which regulates a flow of refrigerant to the evaporator based on cooling demand.

3. The air conditioning system of claim 1, wherein the second sub-cooler includes an incoming refrigerant tube and an outgoing refrigerant tube, wherein the incoming refrigerant tube and outgoing refrigerant tube are oriented such that a line defined between a center of the incoming refrigerant tube and the outgoing refrigerant tube is substantially vertical.

4. The air conditioning system of claim 3, wherein the metering device is a thermal expansion valve, which regulates a flow of refrigerant to the evaporator based on cooling demand.

5. The air conditioning system of claim 1, wherein the evaporator includes at least a first evaporator tube and a second evaporator tube spaced from the first evaporator tube such that an inner surface of the first evaporator tube faces an inner surface of the second evaporator tube with a space provided therebetween, and wherein the evaporator overlays the second sub-cooler with a center point of the second sub-cooler disposed directly below the space between the first evaporator tube inner surface and the second evaporator tube inner surface.

6. The air conditioning system of claim 5, wherein the evaporator overlays an entirety of an upper surface of the second sub-cooler.

7. An HVAC system for a vehicle comprising:
an air conditioner system including:
a compressor to pressurize a refrigerant cycling through the air conditioning system;
a condenser located downstream of and fluidly connected to the compressor to condense the refrigerant;
a first sub-cooler located downstream of and fluidly connected to the condenser to reduce a temperature of the refrigerant to a temperature that is less than a temperature of the refrigerant exiting the condenser;
a second sub-cooler located downstream of and fluidly connected to the first sub-cooler;
a metering device located downstream of and fluidly connected to the second sub-cooler to reduce a pressure of the refrigerant; and
an evaporator located downstream of and fluidly connected to the metering device to convert the refrigerant from a liquid to a gas, the evaporator being located upstream of and fluidly connected to the compressor,
wherein the evaporator includes at least a first evaporator tube and a second evaporator tube spaced from the first evaporator tube such that an inner surface of the first evaporator tube faces an inner surface of the second evaporator tube with a space provided therebetween, and wherein the second sub-cooler is arranged below and spaced from the evaporator at a position where an entirety of an upper surface of the second sub-cooler is overlaid by the evaporator and a center point of the second sub-cooler is disposed directly below the space between the first evaporator tube inner surface and the second evaporator tube inner surface, such that water condensation formed on the inner surface of the first evaporator tube and the inner surface of the second evaporator tube drains onto the second sub-cooler to cool the second sub-cooler such that a temperature of the refrigerant exiting the second sub-cooler is less than a temperature of the refrigerant exiting the first sub-cooler.

8. The HVAC system of claim 7, further comprising:

a heat resistant-insulating material arranged in a space between a lower portion of the evaporator and an upper portion of the second sub-cooler to reduce heat dissipated by the second sub-cooler from rising upward toward the evaporator; and a housing in which only the evaporator, the second sub-cooler, and the heat resistant-insulating material are housed.

9. The HVAC system of claim 8, wherein the metering device is a thermal expansion valve, which regulates a flow of refrigerant to the evaporator based on cooling demand.

10. The HVAC system of claim 7, further comprising a housing in which only the evaporator is housed, wherein the second sub-cooler is arranged directly below and outside of the housing.

11. The HVAC system of claim 10, wherein the second sub-cooler includes an incoming refrigerant tube and an outgoing refrigerant tube, wherein the incoming refrigerant tube and outgoing refrigerant tube are oriented such that a line defined between a center of the incoming refrigerant tube and the outgoing refrigerant tube is substantially vertical.

12. The HVAC system of claim 11, wherein the metering device is a thermal expansion valve, which regulates a flow of refrigerant to the evaporator based on cooling demand.

* * * * *